United States Patent [19]

Akkerman et al.

[11] 4,160,463
[45] Jul. 10, 1979

[54] FLOW LINE MONITOR PILOT VALVE ASSEMBLY

[75] Inventors: Neil H. Akkerman; Stephen R. Foster; Kip B. Goans, all of New Orleans, La.

[73] Assignee: Baker CAC, Inc., Belle Chasse, La.

[21] Appl. No.: 841,940

[22] Filed: Oct. 13, 1977

[51] Int. Cl.² .................... F16K 11/16; F16K 31/122
[52] U.S. Cl. .............................. 137/596.18; 137/458; 251/63.4
[58] Field of Search ........... 137/456, 458, 461, 596.18; 251/63.4

[56] References Cited

U.S. PATENT DOCUMENTS

| | | | |
|---|---|---|---|
| 3,007,492 | 11/1961 | Grimmer | 137/596.18 |
| 3,943,974 | 3/1976 | Connelly et al. | 137/625.66 X |

Primary Examiner—Gerald A. Michalsky
Attorney, Agent, or Firm—William C. Norvell, Jr.

[57] ABSTRACT

A control fluid valve assembly is provided which is respondable to a pressure monitored fluid. The assembly preferably comprises first and second valve seats within a housing. A spool element is shuttleable within the housing near the valve seat by either manual or mechanical manipulation to first and second positions and is responsive to pressure variation within the monitored fluid to shuttle it to a second position. Balls are contained in first and second valve head groups and are carryable by the spool element, the balls being selectively sealingly engagable onto and wipable off of the valve seat means to control fluid flow of the control fluid within the assembly in response to the pressure monitored fluid. A plurality of seals are defined between the housing and the spool means to prevent fluid communication therebetween and to define flow passageways across the spool. The spool is shiftable to each of first and second positions and when in one of the positions pressure is substantially equalized within the flow passageways and the spool is statically stabilized. When the spool is shiftable to the other position, pressure differential defined across one of the seals urges and holds the spool in this second position. A control shaft is provided which is selectively communicable to the spool for shuttling the spool in one direction to one position. Piston means are provided which are responsive to predetermined increase and/or decrease in pressure of the monitored fluid for shifting the shaft to shuttle the spool.

21 Claims, 10 Drawing Figures

FLOW LINE MONITOR PILOT VALVE ASSEMBLY

BACKGROUND OF THE INVENTION

1.

As of the Invention

The invention relates to a flow line monitor pilot valve assembly which automatically activates a spool valve assembly to block and bleed control fluid for manipulation of a downstream valve mechanism to closed position when abnormal pressures in a monitored fluid are detected. The spool valve is manually or mechanically manipulated at any time to open or close the downstream valve.

2. Description of the Prior Art As a safety precaution, oil and gas wells are required to contain one or more subsurface safety valves, which are typically of ball-type construction and are manipulated between open and closed position by variation of hydraulic control pressure. The safety valves are manipulatable to closed position when detection devices immediate the well respond to an unfavorable condition, such as an increase in temperature, indicating a fire, or by abnormal increase or decrease in well production flow, indicating a flow line plug or rupture. The monitoring devices transmit the abnormal signal to a device which causes automatic loss of hydraulic control fluid to the safety valve, and the safety valve is manipulated to closed position.

Pilot relays heretofore utilized have incorporated pressure unbalanced poppet-type valving mechanisms because spool valves having very close tolerance metal sleeves result in high friction being encountered across the valve as the head is shifted with respect to its seat. Thus, it would be desirable to have a valving mechanism which does not encounter friction as the head is moved relative to the seat.

Some prior art pilot relays are pressure unbalanced and require pneumatic signal to allow hydraulic pressure to the downhole safety valve. In these systems, the pneumatic source is typically tapped from the well, so that when the well is shut in, there is no source of control fluid to reopen the valves. This, in turn, has required utilization of mechanical defeat mechanisms or hand pumps to activate the system to manipulate the valve again to open position. These start-up techniques, if not mechanically released, will defeat the entire safety system.

Valving mechanisms heretofore known and utilized have required the incorporation of numerous valves and complicated circuitry. The multiplicity of valves has been utilized to interface many sensing signals, usually at a minimum of one valve per signal. In these systems, manual valves are required to by-pass sensing signals for start-up. Additionally, other manual valves are required to shut down the system. Frequently, hand pumps or mechanical defeat mechanisms have been required to start up the systems. Not only are these valving systems complicated, but they are expensive, result in frequent service problems, and, because of their complexity, have a higher probable failure rate, and are thus unreliable.

Some prior art valving means have utilized spherical elements which essentially act as a valve head which is selectively movable onto and off of an adjacent seat by means of a spool element which is shuttled to manipulate a spherical element. For example, U.S. Pat. No. 2,574,335 discloses two sets of two ball elements each which are opened and closed at the same time in a fluid pressure motor device for control systems. The shuttle device contains a conical carrier surface manipulating a first ball on the conical or beveled surface to move an enlarged ball thereon between open and closed position within flow passageways.

U.S. Pat. No. 2,891,518 utilizes spherical or ball elements which are not normally free traveling or sealingly engagable upon a seat by differential pressure caused by fluid flow.

U.S. Pat. No. 2,967,544 also is typical of the prior art utilizing spherical elements as a valve head. This patent utilizes compressed spring elements and a mechanical manipulator to shift the balls between opened and closed position with respect to their ports. The spherical or ball elements are not carried by a spool which is shuttleable.

U.S. Pat. No. 3,007,492 discloses a pilot valve for fluid flow systems utilizing a spherical or ball element as the valve head. The ball elements are contained within a shuttleable spool element which is only shuttleable by exertion of a spring element in one direction. A piston head in a piston chamber is utilized to shuttle the spool in the opposite direction against the spring.

U.S. Pat. No. 3,053,279 discloses a directional valve containing a plurality of ball elements manipulatable by a spool to control flow from a second passageway to a first passageway. In one position of the spool, all of the balls are positionable on each of the respective seats. This valve is utilized to control flow from a second passageway to a first passageway, and flow therebetween is controlled by the positioning of a ball within the first passageway.

The present invention obviates the problems set forth above and differs substantially from the prior art. The present invention allows shifting of the spool element in response to detected abnormal pressure of a monitored fluid to block and bleed control fluid without affecting manual control capabilities. Additionally, the present invention does not require by-pass valves, mechanical defeat devices, or hand pumps for system start-up. Additionally, the present invention does not rely upon pressure unbalanced poppet-type valve mechanisms, but provides a bi-stable valve which tolerates exposure to high pressures. Additionally, the present invention permits easy manual or mechanical shuttling of the spool assembly at any time. Moreover, the present invention differs substantially from the prior art by utilization of a spool element containing spherical or ball means carried thereby which are selectively engageable onto and wipable off of their respective seats.

Other advantages of the present invention will be apparent from a reading of the FIGS., the specification, and the claims below.

SUMMARY OF THE INVENTION

The present invention provides a pilot valve assembly which monitors line pressure tapped from a well or other flow line condition and automatically blocks and bleeds instrument pressure when pre-set high or low line pressure limits are violated. The present apparatus accommodates high instrument pressures, i.e., 10,000 p.s.i., this feature allowing direction control of a well head safety system, including the subsurface safety valve, without utilization of separate hydraulic and pneumatic power sources or their related interface mechanisms. When sensed pressure is within the pre-set limits, control fluid pressure is transmitted to the downstream safety system to manipulate and maintain it in open position. When sensed pressure is not within the pre-set limits and is above or below the pre-set limits, control fluid pressure is blocked within the assembly and fluid is bled from the controlled device. Pressure limits are established by choice of sensing piston size and threaded adjustment of the respective opposing spring force.

The present invention utilizes a valve assembly preferably having a plurality of valve seats within the housing. A spool is shuttleable immediate the valve seats by manual or mechanical manipulation to plural positions and is responsive to pressure variation in the monitored fluid to shuttle it to a second position. Spherical elements contained in valve head groups are carryable by the spool elements and are selectively sealingly engagable onto and wipable off of the valve seats to control fluid flow within the apparatus in response to pressure monitored fluid. Seals are defined between the housing and the spool means to prevent fluid communication and to define flow passageways across the spool. The spool is shiftable to one position wherein pressure is substantially equalized within the flow passageways and the spool is statically stabilized in this position. When the spool is shifted to another position, pressure differential is defined across the seals and urges and holds the spool in this position. A control shaft is provided which is communicable to the spool for shuttling the spool in one direction to one position. Piston means are provided which are responsive to predetermined increase and/or decrease in pressure of the monitored fluid for shifting the shaft to shuttle the spool. The apparatus is selectively calibrated to respond to high and/or low pressure tolerance to cause shuttling of the spool and manipulation of the balls with respect to the seats for flow passageway variation to selectively open and close a subsurface safety valve.

DESCRIPTION OF THE PREFERRED EMBODIMENTS

Figure 1A:
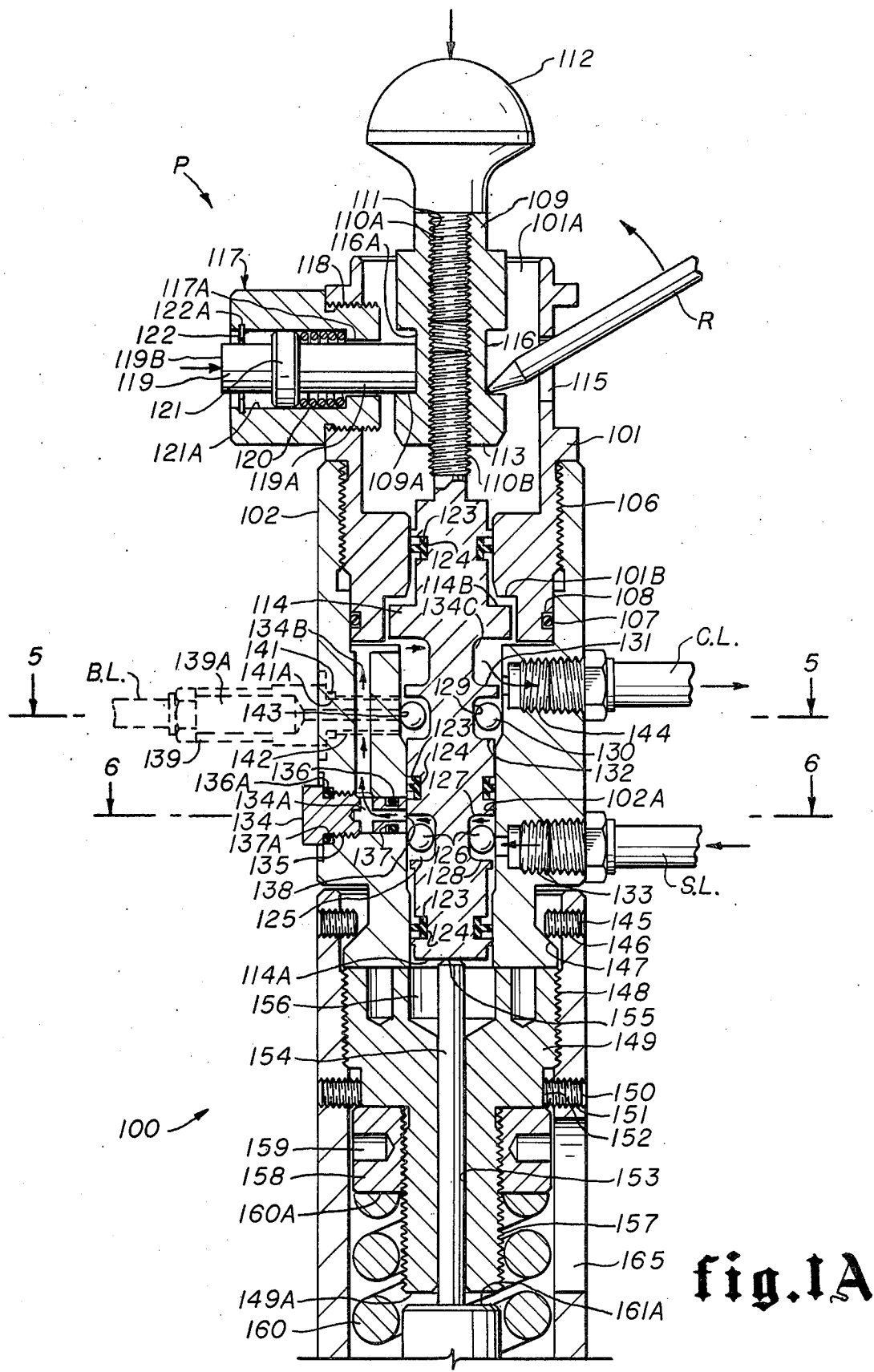
FIGS. 1A and 1B together constitute a longitudinally extending half sectional view of the pilot assembly of the present invention subsequent to affixation to external lines, the view illustrating a setting rod being inserted to pry a detent nut and spool assembly into position with a detent pin being engaged within the detent nut prior to initial activation of the pilot assembly.

As illustrated in the drawings, a pilot assembly P is comprised of an elongated housing 100 which, in turn, consists of a detent assembly housing 101, a spool valve housing 102, and upper and lower spring housing members 103 and 104, respectively, the housings 103 and 104 being separated by an interconnected pressure chamber housing 105.

The detent housing 101 is secured to the spool valve housing 102 by threads 106. An elastomeric seal element 107 carried within an engrooved bore 108 within the detent housing 101 prevents fluid communication between the housing 101 and the spool valve housing 102. At the upper end of the detent housing 101 is a circular bore or opening 101A for receipt therethrough of a detent nut 109 which, in turn, receives therethrough an elongated pin element 110A having thread elements 111 for selective affixation within the detent nut 109 of a hand manipulatable semicircularly defined knob element 112 which protrudes exteriorly on the pin element 110A. A similar pin element 110B extends interiorly out of and through the detent nut 109 at the lower face 113 of the nut 109 and defines a spool element 114 thereon, as described below.

An opening or bore 115 is defined through the detent housing 101 on one side thereof for selective receipt therethrough of a rod element R which is utilized to urge the detent nut 109 and the spool 114 to position for initial operation. The rod R is received within a companion groove 116 defined inwardly upon the exterior of the detent nut 109.

To one side opposite the opening 115 of the detent housing 101 is a detent assembly 117 secured to the detent housing 101 by means of threads 118. The detent assembly 117 houses an elongated inwardly protrudable detent pin 119 which is urged normally outwardly of the detent housing 101 by means of a compressible spring element 120 carried within the detent assembly 117, a ring 121 being carried outwardly around and on the exterior of the detent pin 119 and shouldering with one end of the spring element 120. A retainer ring 122 is housed within a grooveway 122A within the detent assembly 117 to contain the ring 121 when the detent pin 119 is in the expanded position, caused by the compressive force defined through the spring 120 acting on the ring 121 to urge the detent pin 119 outwardly and away from the detent housing 101. The detent pin 119 has an inner end 119A which protrudes through a bore 117A in the detent assembly 117, the inner end 119A being received within a grooveway 116A defined exteriorly on the detent nut 109, the grooveway 116A actually being one side of the grooveway 116, the grooveways 116A and 116 being continual around the nut 109.

An upwardly facing shoulder 109A is defined as the lower shoulder of the grooveways 116 and 116A on the detent nut 109 for engagement on one side thereof of the inner end 119A of the detent pin 119.

The outer end 119B of the detent pin 119 is exterior of the detent assembly body 117 and receives the finger or palm of a serviceman to set the detent pin 119 within the groove 116A.

The spool valve housing 102 receives the spool portion 114 carried by the pin 110B. The spool 114 has upper, central and lower T-seals 123 housed within their respective bores 124 which slide along the smooth inner surface 102A of the spool valve housing 102 and prevent fluid communication at their respective positions between the spool 114 and the spool valve housing 102. A first camway 125 is defined on the spool 114 to permit free travel therearound of a plurality of spherical or ball elements 126, the camway 125 having an upper shoulder 127 and a lower shoulder 128 for controlling travel of the balls 126 around the interior surface 102A of the spool valve housing 102 and within the camway 125. A similar and second camway 129 is defined on the spool 114 upwardly of the camway 125, the camway 129 receiving a plurality of similar spherical or ball elements 130, the camway 129 having an upper shoulder 131 and a lower shoulder 132 for guiding travel of the balls 130 immediate the surface 102A of the spool valve housing 102. The central and lower T-seals 123 define therebetween a first fluid flow chamber while the central and upper T-seals 123 define therebetween a second or upper fluid flow chamber across the spool 114.

The spool valve housing 102 also has defined on one side thereof a supply pilot 134 which is secured through the spool valve housing 102 by means of threads 135, an elastomeric ring element 136 being carried around the exterior of the supply pilot 134 and within a bore 137 to prevent fluid communication between the supply pilot 134 and the spool valve housing 102. A similar ring element 136A defined within its bore 137A is also carried on the supply pilot 134 immediate the threads 135 to prevent fluid communication between the supply pilot 134 and the housing 102. The supply pilot 134 has at its interior end an engrooved seat 138 which selectively receives a portion of the exterior of the spherical or ball element 126 upon manipulation of the spool 114. The seat 138 is open to the interior of the supply pilot 134, the interior defining a fluid passageway 134A which is always in communication with a passageway 134B transverse thereof and within the spool valve housing 102.

The spool valve housing 102 also receives therethrough a bleed assembly 139 which is secured to the housing 102 by means of threads 142, the bleed assembly 139 receiving at its exterior end a bleed line BL and having defined laterally therethrough a flow passageway 139A for communication between the bleed line BL and an inner flow passageway 134C around the spool 114. The bleed assembly 139 has at its interior end an open seat 143 of same design as the seat 138, the seat 143 selectively sealingly engagable by one of the spherical or ball elements 130 upon manipulation of the spool 114, as described below. An elastomeric ring 141 within its respective grooveway 141A on the bleed assembly 139 prevents fluid communication between the bleed assembly 139 and the spool valve housing 102.

On the opposite side of the bleed assembly 139 and supply pilot 134 is a threaded bore 133 for receipt of a supply line SL. A similar threaded bore 144 is also defined on the spool valve housing 102 for receipt of a valve control line CL.

The spool valve housing 102 is affixed to the upper spring housing 103 by means of threads 148. Additionally, the housings 102 and 103 are associatably affixed one to the other by means of protruding set screw elements 145 secured within the housing 103 by threads 146, the screws 145 being carried along a beveled shoulder 147 of the spool valve housing 102 such that the housings 103 and 102 may be rotated with respect to each other for easy affixation of the flow monitor line ML, supply line SL and the valve control line CL. A similar set screw 150 is secured within the housing 103 by means of threads 151, the set screws 150 interfacing at the smooth outer surface 152 of an operator stop 149 within the housing 103 and secured thereto by means of threads 148.

The upper spring housing 103 receives through the interior thereof the operator stop element 149 having a central bore 153 defined elongatedly therethrough for receipt of an extended operator pin 154 having an outer protruding end 155 extending out of the upper end 156 of the operator stop 149 for selective interface with the lower end 114A of the spool 114. The operator pin 154 is a protruding elongated extension of an operator main body 161 housed within the interior of the upper spring housing 103, the main body 161 receiving through a lower bore 163 an operator shaft 164 which is movably housed within the main body 161 and in the bore 163 at the end 162 thereof. The operator stop element 149 also has its lower end 149A which serves as the upstop for travel of the main body 161 in response to excessively high pressure, the main body upper end 161A interfacing with the lower end 149A at such time.

The upper spring housing 103 also contains therein a circularly compressed spring element 160, the upper end 160A of which shoulders on a spring adjuster 158 which is secured by threads 157 to the operator stop 149. A bore 159 is defined laterally through the spring adjuster 158 for receipt of an adjustment rod (not shown) through the window 165 of the upper housing 103 for selective setting of the compressive tension within the spring 160. The spring 160 has its lower end 168 received on a lower spring retainer element 167 having a central bore 169 therethrough for receipt of the operator shaft 164.

The upper spring housing 103 is secured to the pressure chamber housing 105 therebelow by means of threads 166. The pressure chamber housing 105 contains a high pressure piston element 170 having a central bore 177 therethrough of the same diameter as the bore 169 of the spring retainer 167. The high pressure piston 170 is received through the central bore 170A of a piston sleeve 170B, the upper end 179 of the piston sleeve 170B and the upper end 179A of the piston 170 normally interfacing with the lower face of the spring retainer 167. A T-seal 171 is housed within a bore 172 defined on the piston sleeve 170B to prevent fluid communication between the piston sleeve 170B of the pressure chamber housing 105, a similar T-seal 173 being housed within a bore 174 to prevent fluid communication between the piston sleeve 170B and the high pressure piston 170 as the high pressure piston 170 is permitted to slide through the piston sleeve 170B. A similar T-seal 175 is housed within its bore 176 to prevent fluid communication between the high pressure piston 170 and the operator shaft 164 as the operator shaft 164 is permitted to slide within the bore 177 of the piston 170 during the operation of the pilot assembly P.

The pressure chamber housing 105 has on one side thereof a threaded bore 181 which normally receives a solid plug 182 sealingly engaged therethrough. Laterally of the threaded bore 181 is a similar threaded bore 186 which normally receives a flow monitor line ML therethrough. Interiorly between the threaded bores 181 and 186 is a pressure chamber 180 which is defined around the exterior of the operator shaft 164, the T-seals 173, 171 and 175 defining the upper end of the pressure chamber 180.

The pressure chamber housing 105 also houses a low pressure piston element 183 which slidably receives through its central bore 187 the operator shaft 164. A T-seal element 184 is carried within a bore 185 within the low pressure piston 183 to prevent fluid communication between the piston 183 and the housing 105 as the piston 183 is permitted to slide along the interior of the housing 105. An O-ring element 188 is carried within a bore 189 on the operator shaft 164 to prevent fluid communication between the shaft 164 and the piston 183. The ring 188 and the T-seal 184 define the lower end of the pressure chamber 180.

The operator shaft 164 protrudes through the piston 183 lowerly thereof and within a bore 193 of a lower spring plate 192, the operator shaft 164 containing an adjustable pin element 190 having threads 191 thereon for selective securement through the bore 193 of the spring plate 192 to assist in adjustment of compressive force exerted through a lower spring element 196 and to enable proper assembly of the component parts of the apparatus. The pin 190 and spring plate 192 are securely fastened by a lock nut 190A.

The piston element 183 provides an outer protrusion 183A which, when interfaced with a shoulder 104A of the housing 104, defines the downstop for travel of the piston element 183.

The pressure chamber housing 105 is secured to a lower spring housing 104 by means of threads 195, the housing 104 containing therein a compressed spring element 196 having its upper end interfacing on a spring shoulder 194 defined on the spring plate 192, the spring 196 having its lower end 199 interfacing on a similar spring shoulder 198 grooved around a spring retainer element 197. The spring retainer element 197 receives an adjustment screw 200 which is inserted through the lower spring housing 104 at the lower end 202 thereof by means of threads 201. The adjustment screw 200 may be rotated clockwise or counter-clockwise within the spring housing 104 to adjust compressive force on the spring 196.

The interior 203 of the lower spring housing 104 and the interior 204 of the upper spring housing 103 each are at substantially atmospheric pressure and are operably associatable with their respective pistons 183 and 170 to provide respective differential pressure thereacross.

OPERATION

Figure 1B:
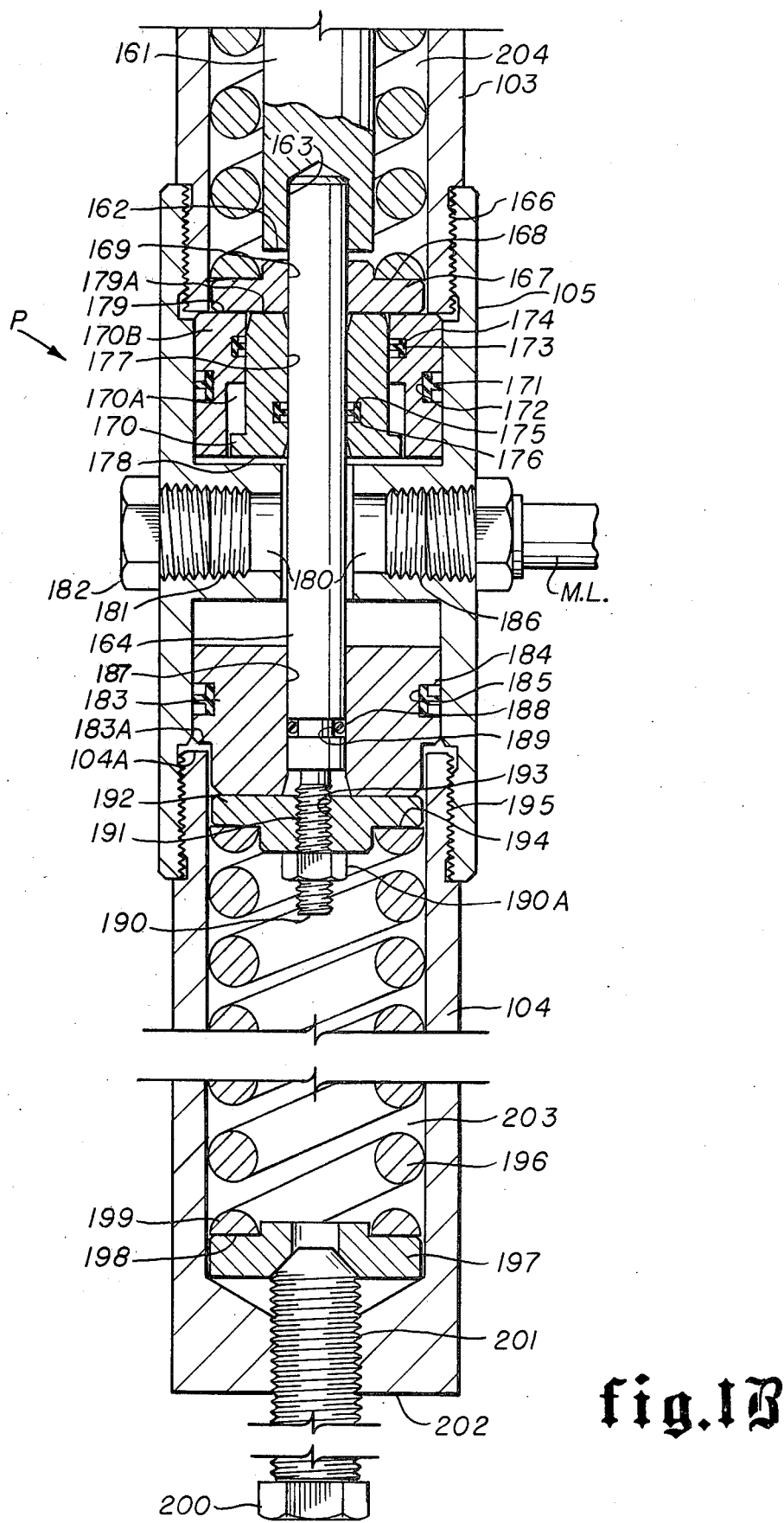

Referring now to FIGS. 1A and 1B, the supply line SL, valve control line CL, bleed line BL, and flow monitor line ML each are shown as affixed with the housing 100 and through their respective bores.

In the quiescent state, that is, prior to the pilot assembly P receiving control fluid or monitor pressure therein, and prior to setting of the pilot assembly P for initial activation, the spring 196 urges the spring plate 192 to interface at the end 183A of the low pressure piston 183. The operator shaft 164, being affixed through the spring plate 192, and being snugly housed in the bore 163 of the operator main body 161, causes the end 155 of the operator pin 154 to encounter the lower end 114A of the spool 114 such that the spool 114 is positioned within the spool valve housing 102 to position the shoulder 127 sufficiently away from the seat 138 of the supply pilot 134 to enable the balls 126 to pass substantially around the supply pilot 134. With the spool 114 positioned as described above, fluid flow from the supply line SL would be prevented from passing around the camway 125 and into the passageway 134A of the supply pilot 134 because the fluid flow would cause one of the balls 126 to become sealingly engaged onto the seat 138, pressure around the spool 114 within the camway 125 between the central and lower T-seals 123 being substantially greater than the atmospheric pressure within the passageway 134A. Accordingly, it is necessary to shift the spool 114 to enable one of the balls 130 to block the bleed assembly 139 and prevent any of the balls 126 from becoming sealingly engaged upon the seat 138 of the supply pilot 134 to permit fluid flow through the pilot assembly P to activate the subsurface safety valve.

Thus, in order to move the spool 114 to position for the pilot assembly P to automatically receive fluid within the supply line SL for transmission therethrough to the valve control line CL, the setting rod R is inserted through the opening 115 of the detent housing 101, the end of the rod R being placed within the groove 116 of the detent nut 109 to exert and transmit a downward force on the detent nut 109 and spool 114. As this downward force is exerted through the spool 114, the operator pin 154, operator main body 161, and operator shaft 164 are urged downwardly against the spring 196. The spring 196 will contract and the spring plate 192 will continue to interface with the end 183A of the low pressure piston 183, and the end 155 of the operator pin 154 still will be engaged at the lower end 114A of the spool 114 because of the continued downward force exerted on the detent nut 109 by the rod R and because of the upward force urged through the spring 196 to the operator shaft 164 and its inter-related parts. At the same time that force is exerted on the rod R, the groove 116A on the detent nut 109 and the bore 117A of the detent assembly body 117 will become latitudinally interaligned. A serviceman's palm or finger then may be placed upon the outer end 119B of the detent pin 119 to apply an inward exertion to the detent pin 119 to overcome the spring 120 whereby the detent pin 119 is moved inwardly and into the groove 116A. In this position, the rod R may be removed from within the groove 116. When the downward force which has previously been transmitted by the rod R to the detent nut 109 is removed, the spring 196 will be enabled to urge the operator shaft 164 and its inter-related parts to move the spool 114 and detent nut 109 just slightly upwardly whereby the inner end 119A of the detent pin 119 becomes shouldered on the detent nut 109 at the shoulder 109A to prevent further upward movement of the spool 114.

As shown in FIG. 1A, in this position, the spool 114 is in a locked position whereby the shoulder 127 has been moved across the supply pilot 134 to prevent the balls 162 from moving onto the seat 138 of the supply pilot 134. Additionally, the shoulders 131 and 132 are positioned immediate the bleed assembly 139 and the seat 143 such that, when fluid and pressure are transmitted within the passage 134C, one of the balls 130 may seek and become sealingly engaged upon the seat 143 to prevent fluid passage through the bleed assembly 139.

Prior to or after the pilot assembly P has been set for initial activation, the supply line SL, valve control line CL, bleed line BL and flow monitor line ML each are affixed within the housing 100 through their respective threaded bores. Control pressure then is permitted to be transmitted from a supply source (not shown) through the supply line SL, into the threaded bore 133, around the camway 125 between the central and lower T-seals 123, thence through the open seat 138 of the supply pilot 134 and into the passageway 134A, whereafter it is received transversely through the passageway 134B, through the passage 134C above the camway 129 and between the central and upper T-seals 123, through the threaded bore 144 and into the valve control line CL for subsequent transmission through the line CL to the subsurface safety valve in the well to shift the safety valve to open position to enable well production flow through the safety valve. Fluid and pressure are prevented from passing through the bleed assembly 139 by the sealing engagement of one of the balls 130 onto the seat 143 of the bleed assembly 139.

It should be noted that the spool 114 will not yet shift longitudinally in either direction when fluid and pressure are initiated from the supply line SL through the spool valve housing 102 to the valve control line CL, and that the detent pin 119 still is in locked position with the detent nut 109, the operator pin 154 having its end 155 abutting the lower end 114A of the spool 114.

After the subsurface safety valve has been manipulated to open position as a result of control fluid being transmitted thereto, the well will be permitted to flow and will be tapped by means of the flow monitor line ML to the pilot assembly P and received therein through the threaded bore 186 and within the pressure chamber 180. As the pressure chamber 180 receives fluid and pressure, the low pressure piston 183 is caused to be shifted downwardly, the end 183A of the piston 183 continuing to interface with the spring plate 192, whereby the force defined through the spring 196 is overcome and the spring 196 will become slightly contracted. Downward travel of the low pressure piston 183 will be terminated upon interface of the protrusion 183A and the shoulder 104A.

Figure 2A:
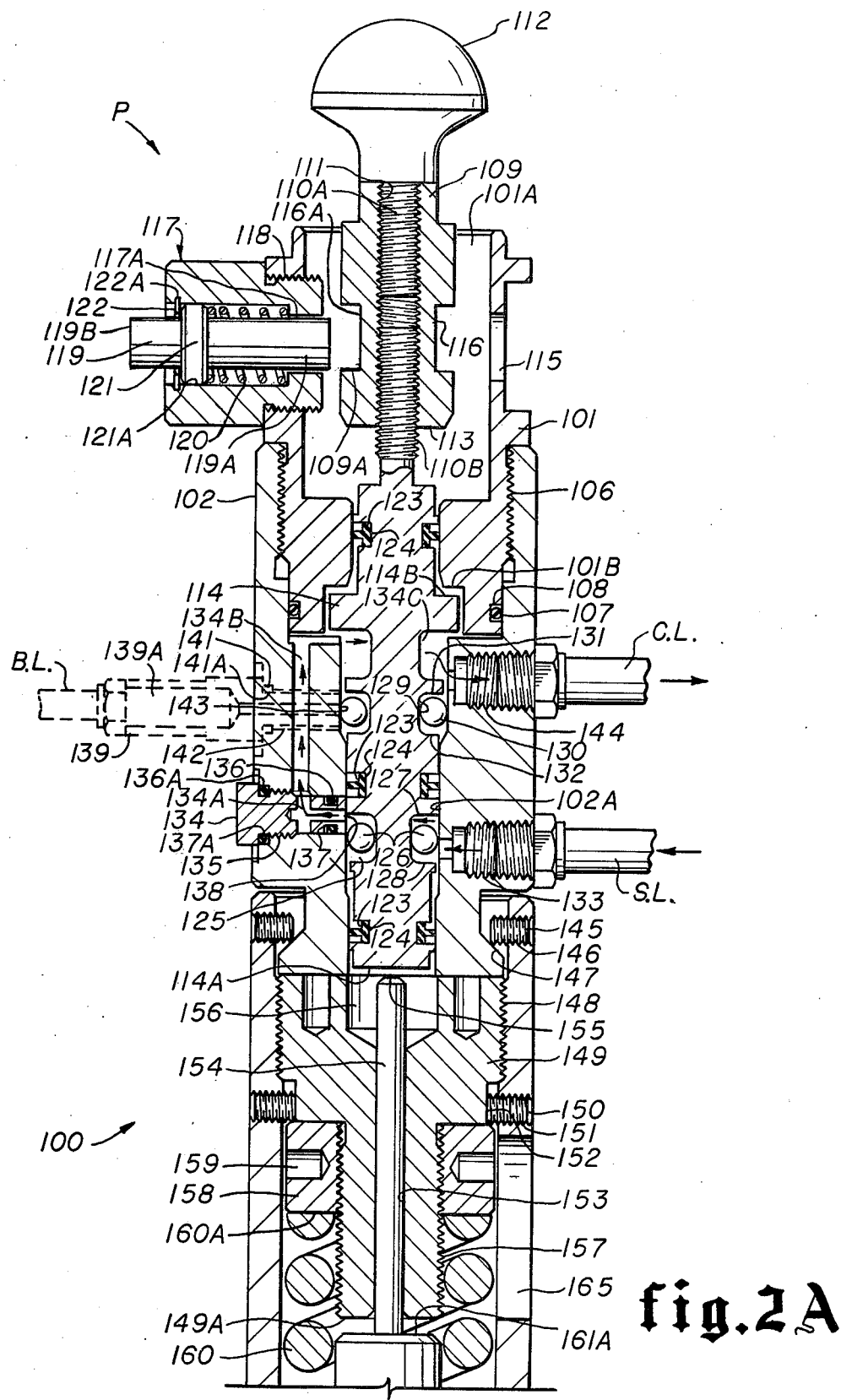
FIGS. 2A and 2B together constitute a longitudinal half sectional view of the pilot assembly, similar to that shown in FIGS. 1A and 1B, when the well flow line is within normal operating range, the flow pathway from the supply line to the safety valve being illustrated by arrows.
Figure 2B:
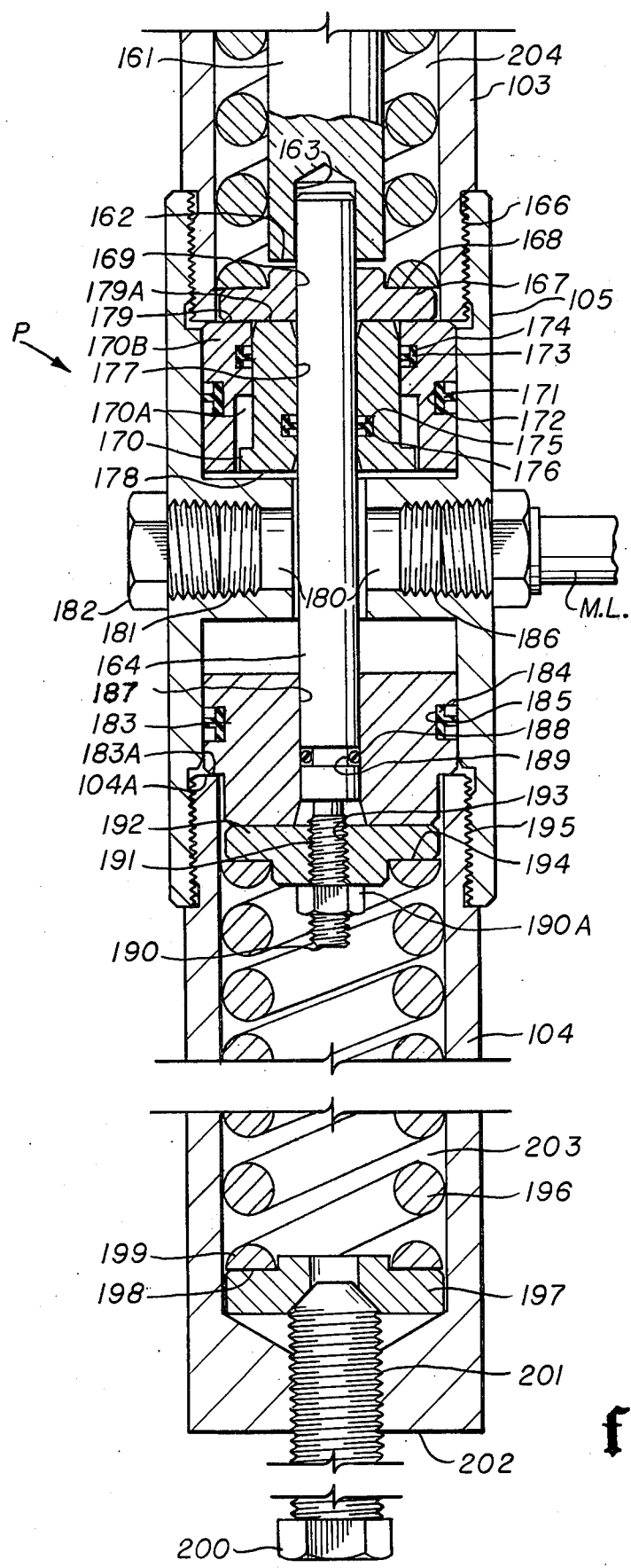

Even though well pressure still is within normal operating range as tapped through the flow monitor line ML, the movement of the piston 183 thus causes a slight downward shifting of the spring plate 192. Accordingly, the operator shaft 164, operator main body 161 and operator pin 154, which are carried with the spring plate 192, move downward slightly such that the end 155 of the operator pin 154 becomes disengaged from position upon the lower end 114A of the spool 114. When the end 155 is free of contact with the lower end 114A of the spool 114, upward urging of the spool 114 against the shouldered detent pin 119 is terminated. Accordingly, the compressed spring 120 in the detent assembly body 117 acts on the ring 121 to shift the detent pin 119 laterally away from and out of the groove 116A. The spool 114 and detent nut 109 are freed from the locked position with the detent assembly without affecting the positioning of the shoulders 131, 132 and 127 with respect to the supply pilot 134 and the bleed assembly 139. The flow path of fluid transmitted from the supply line SL within the spool valve housing 102 and through the valve control line CL in turn is not affected, so long as pressure within the pressure chamber 180 is maintained within the normal operating range of well flow. This positioning of the component parts of the pilot assembly P, i.e., during normal well flow, is as illustrated in FIGS. 2A and 2B.

It should be noted that the spool 114 is stabilized against any substantial or significant longitudinal movement, either upwardly or downwardly, because there is no differential pressure defined across the central T-seal 123, since increased control fluid and pressure are transmitted within each of the camways 125 and 129 and within the upper chamber defined by the first or upper T-seal and the central T-seal and the lower chamber defined between the central T-seal and the lower T-seal, each of the T-seals being identified as 123. However, the spool 114 may be shuttled mutually or mechanically at any time to reverse flow to close the subsurface safety valve.

In the event that pressure from the well flow line exceeds a predetermined value corresponding to the calibration of the spring 160, pressure within the chamber 180 will be increased. However, since normal operating pressure will cause the low pressure piston 183 to shift downwardly until the abutment 183A contacts the shoulder 104A thus preventing further downward travel of the piston 183, the pressure defined within the chamber 180 will now be exerted across the face 178 of the high pressure piston 170. As pressure increases within the chamber 180, the piston 170 will slide longitudinally upwardly in the bore 177 around the operator shaft 164. The spring retainer 167, being urged against the upper end 179 of the piston 170 by the force exerted through the spring 160, now transfers this upward movement to the operator main body 161, the lower end 162 of the main body 161 interfacing with the spring retainer 167. Accordingly, the operator main body 161 and the operator pin 154 are shifted longitudinally upwardly, the bore 163 extends just longitudinally upwardly and away from the end 162 of the shaft 164, and the end 155 of the pin 154 will contact the lower end 114A of the spool 114, whereby the spool 114 is shuttled proportionately upwardly. This movement of the spool 114 will cause corresponding upward movement of the shoulder 127 with respect to the supply pilot 134. Additionally, the shoulders 131 and 132 immediate the balls 130 are moved correspondingly upwardly with respect to the bleed assembly 139 whereby the lower shoulder 132 contacts and engages one of the balls 130 which has been previously sealingly engaged upon the seat 143. The shuttling of the spool 114 causes the shoulder 132 to move the sealed ball 130 and wipe it off of its seat 143 whereby the passage 134C immediately is exposed to the passageway 139A within the bleed assembly 139. Since the bleed assembly 139 is at substantially atmospheric pressure, and the passage 134C has contained pressurized control fluid, the flow of fluid within the chamber between the upper and central T-seals 123 is reversed, and fluid now is transmitted to the spool valve housing 102 from the down hole safety valve through the control line CL, through the threaded bore 144, within the passage 134C, thence through the seat 143, into the passageway 134B and to the bleed line BL to enable the subsurface safety valve to be manipulated to closed position to shut in the well. When reverse flow is initiated through the bleed assembly 139, pressure within the passageways 134A and 134B will drop, causing one of the balls 126 to seek and sealingly engage upon the seat 138 of the supply pilot 134, thus isolating control pressure within the supply line SL from the fluid being dumped from the valve control line CL through the bleed assembly 139. The spool 114 will remain in this position until shuttled manually for reopening of the subsurface safety valve.

Figure 3A:
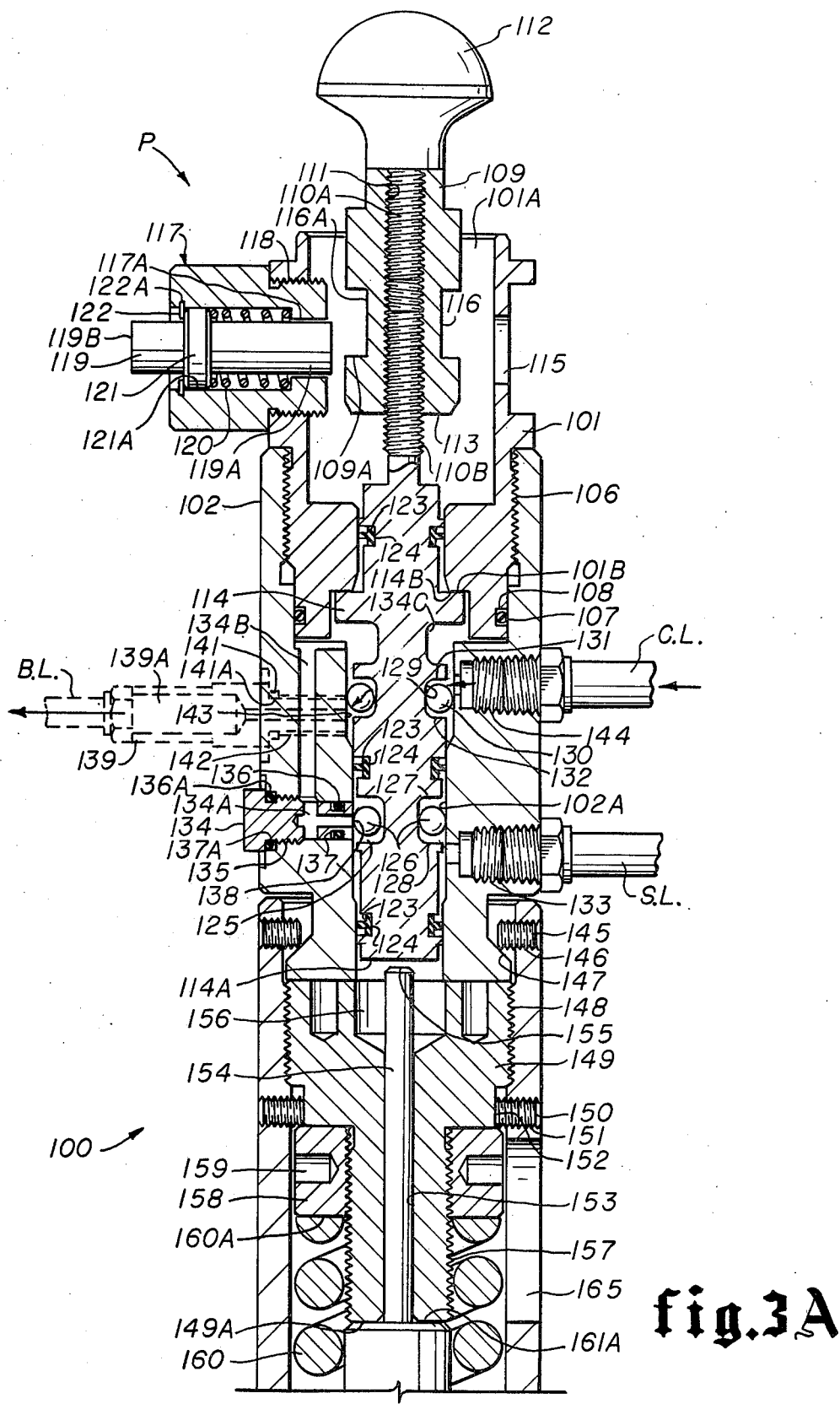
FIGS. 3A and 3B together constitute a view similar to that shown in the FIGS. described above, and illustrating the positioning of the pilot assembly components when pressure within the well flow line exceeds normal operating range, the flow passageway through the spool valve assembly being indicated by arrows to dump control fluid from the safety valve through the pilot assembly to close the safety valve.
Figure 3B:
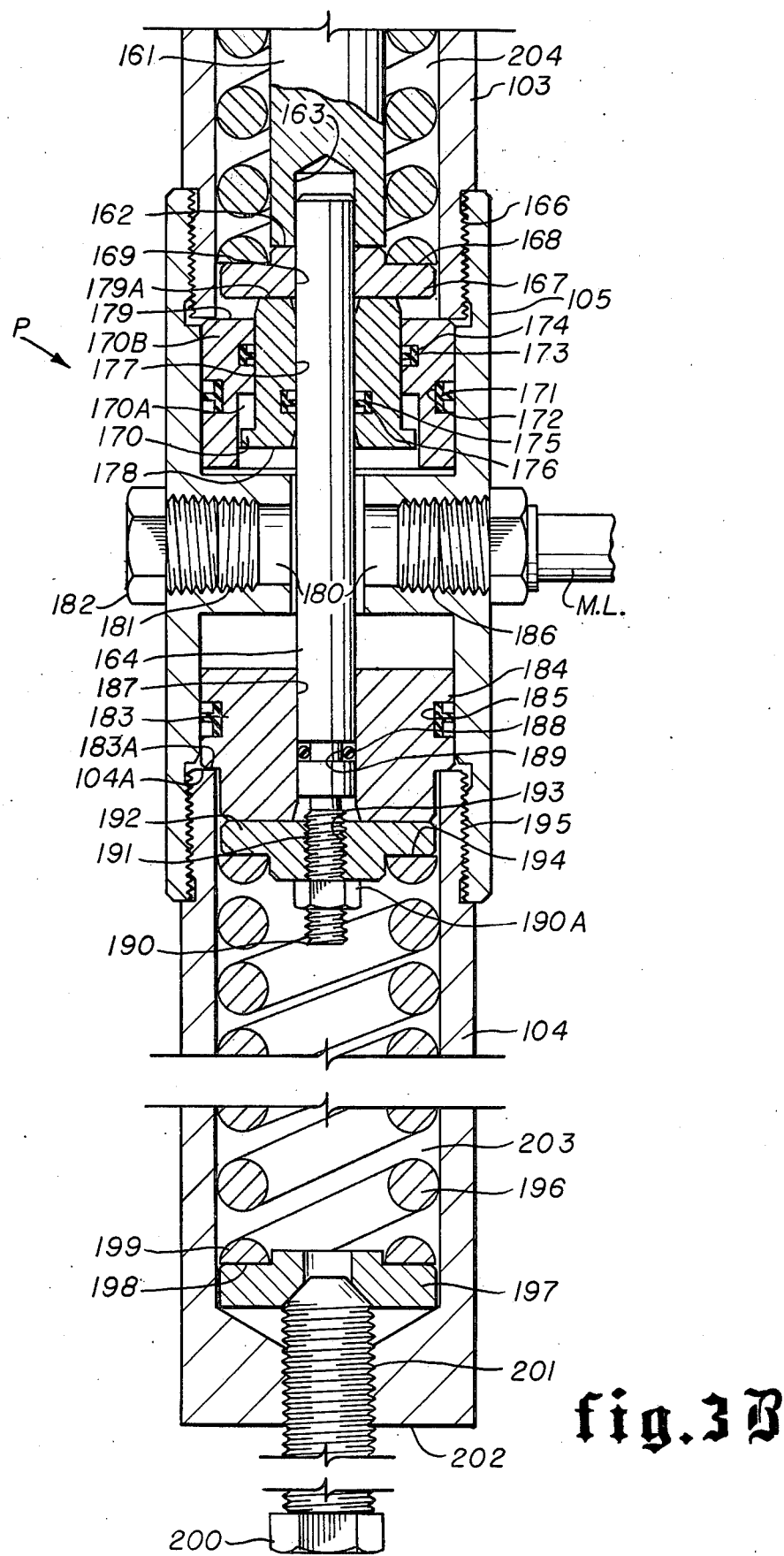
Figure 4A:
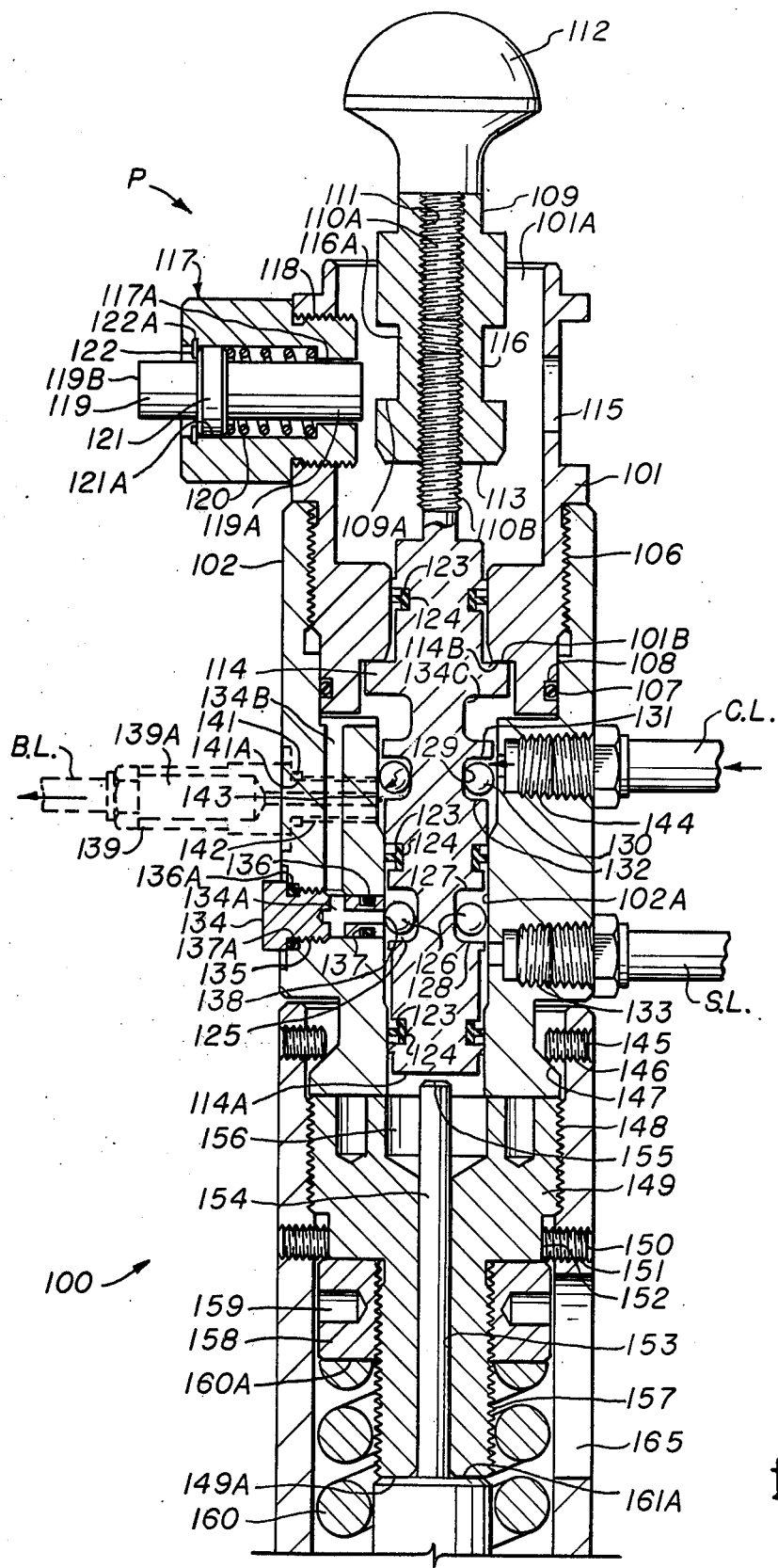
FIGS. 4A and 4B together constitute a similar illustration of the pilot assembly in position subsequent to detection of pressure within the flow line below the normal operating range, with the passageway through the spool valve housing being illustrated by arrows indicating that control pressure from the safety valve is being dumped through the pilot assembly to close the safety valve.
Figure 4B:
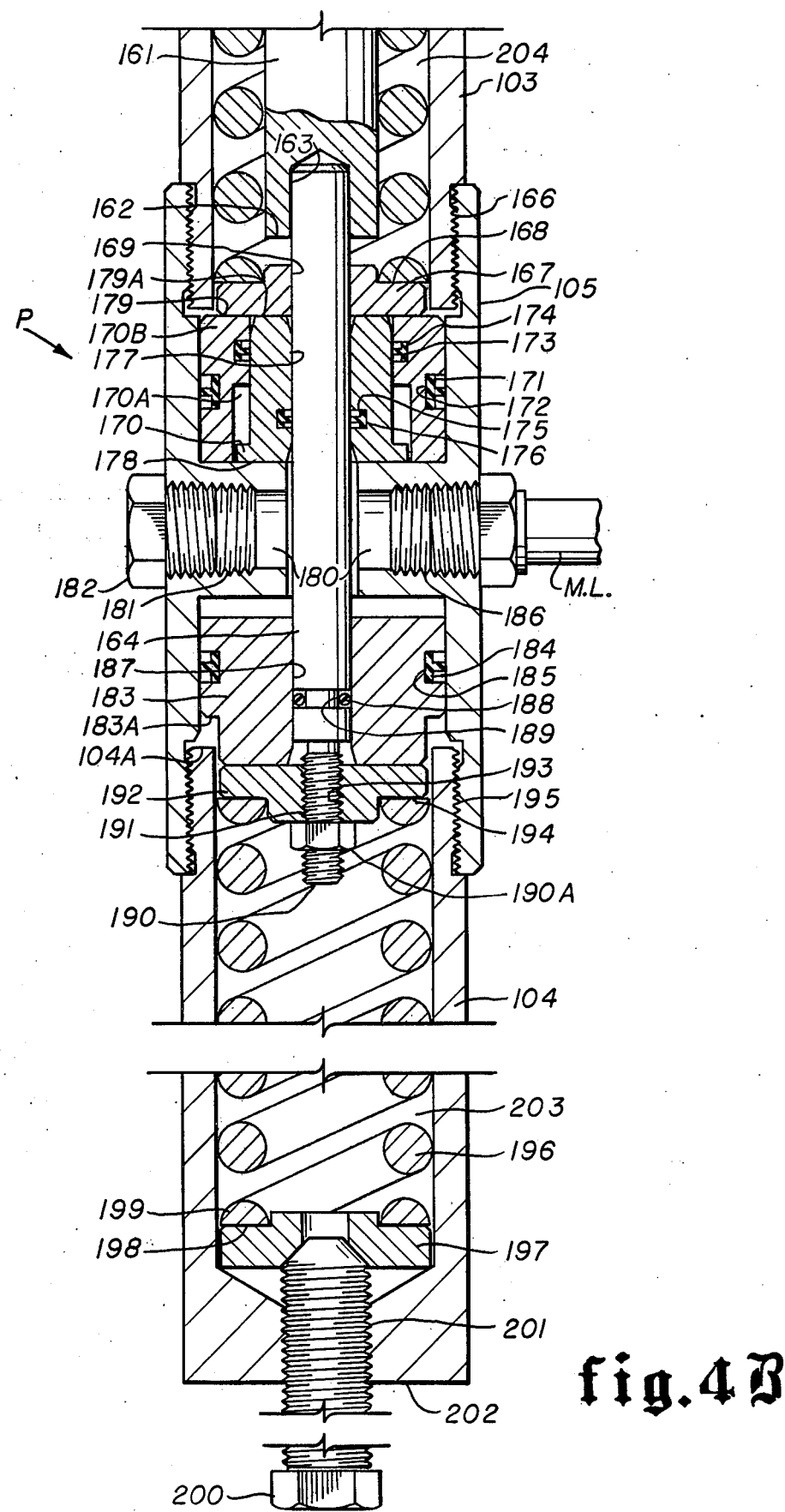
Figure 5:
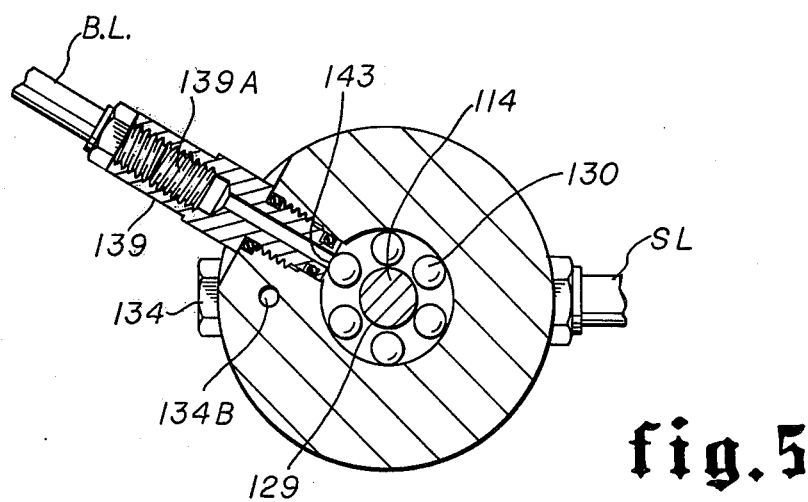
FIG. 5 is a cross-sectional view taken along lines 5—5 of FIG. 1A illustrating the spherical or ball elements in relation to the bleed assembly, with one of the balls being held in sealing engagement upon the seat of the bleed assembly, the angular relationship between the passageway across the spherical elements and the bleed port also being illustrated.
Figure 6:
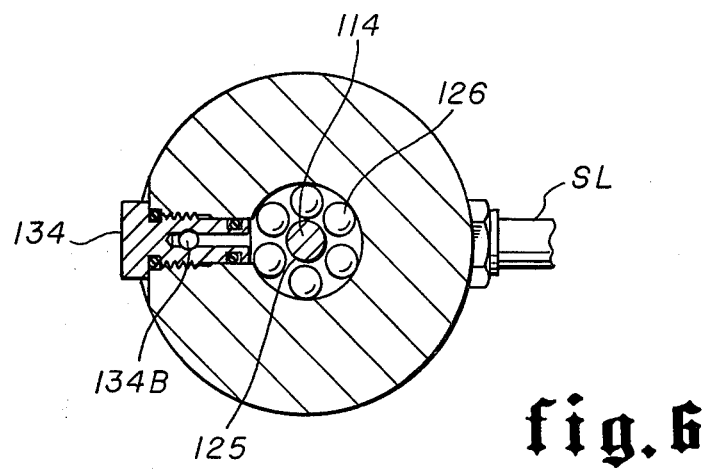
FIG. 6 is a cross-sectional view similar to that of FIG. 5 and taken along lines 6—6 of FIG. 1A illustrating the positioning of the balls with respect to the supply pilot, with all of the balls being held off of the supply pilot seat to permit communication of fluid therethrough.

The shifting of the spool 114 upwardly is assisted by differential pressure which now is defined across the central T-seal 123, since pressure between the central T-seal 123 and the lower T-seal 123 is still defined as the pressure within the supply line SL, while pressure between the upper T-seal 123 and the central T-seal 123 has dropped, and is substantially atmospheric. The spool 114 is shuttled upwardly until the abutment 114B contacts the inwardly extending shoulder 101B of the detent housing 101. This position is as shown in FIGS. 3A and 3B.

In the event that well pressure decreases below the normal operating range, as defined by the calibration of the spring 196, pressure within the chamber 180 will decrease and the compressed force within the spring 196 now will exceed the force defined across the pressure piston 183 to enable the spring 196 to act on the spring plate 192 and the piston 183 and shift the operator shaft 164, the operator main body 161 and the operator pin 154 toward the spool 114. As pressure continues to drop, the spring 196 further expands and the spring plate 192 and piston 183 continue upward movement with the end 155 of the operator pin 154 contacting the lower end 114A of the spool 114. The shoulder 132 rests upon the exterior of the sealed ball 130 which is sealingly engaged upon the seat 143, the contact of the shoulder 132 with the sealed ball 130 wiping the ball 130 off of its seat 143 as the spool 114 continues to be shuttled upwardly.

Concurrently with the repositioning of the shoulder 132, the shoulder 127 immediate the balls 126 is permitted to move upwardly and away from the supply pilot 134. As the sealed ball 130 is wipably removed from its seat 143, the flow path within the chamber in the spool 114 between the upper and central T-seals 123 drops as the passageway 139A is permitted to communicate with the passage 134C immediate the spool 114. Flow then is transmitted from the subsurface safety valve through the valve control line CL, within the passage 134C, through the open seat 143, thence within the passageway 139A and out the bleed assembly 139, and the subsurface safety valve is manipulated to closed position. When the sealed ball 130 is disengaged from its seat 143, the reverse flow initiation causes one of the balls 126 to seek and sealingly engage upon the seat 138 of the supply pilot 134, thus isolating control pressure defined through the supply line SL from the passageway 134A. Again, in this position, a differential pressure is defined across the central T-seal 123, the pressure within the chamber between the central seal 123 and the lower seal 123 being defined as the pressure contained within the supply line SL, and the pressure in the chamber between the central T-seal 123 and the upper T-seal 123 defining the lower or substantially atmospheric venting pressure. This differential pressure across the central T-seal 123 will cause continued urging of the spool 114 upwardly until such time as the abutment 114B interfaces with the shoulder 101B of the detent housing 101, thus preventing further longitudinal upward travel of the spool 114 and the spool will be held in this position until manually shuttled to reopen the subsurface valve.

It should be noted that the shuttling of the spool 114 in the direction to reverse the normal flow of fluid through the pilot assembly P when the assembly P detects pressure either above or below normal operating range, is not automatically reversable. That is, once the spool 114 has been shuttled to reverse the flow, it will not automatically shift to position to permit subsequent flow from the supply line SL through the spool valve housing 102 and to the valve control line CL. This is a unique feature of the present invention and is implemented as a safety precaution to assure inadvertent manipulation of the spool once an intolerable pressure variation has been detected to assure prevention of inadvertent reopening of the safety valve within the well.

Once the pilot assembly P has been initially activated and the detent pin 119 has been kicked back to disengagement from the detent nut 109, the spool 114 may be manually shuttled in either direction to permit flow through the spool valve housing 102 to open or close the subsurface valve at any time by hand manipulation of the knob 112 and spool 114 by a serviceman either pulling or pushing the knob 112 until interface occurs between the abutment 114B and shoulder 101B, or interface occurs between the abutment 114B and the spool valve housing 102, respectively.

The spring 160, which defines the upper limits of the normal operation pressure range, may be calibrated at any time by inserting a rod element through the window 165 of the upper spring housing 103 and into the bore 159 to rotate either clockwise or counter-clockwise the spring adjuster 158 to expand or contract the spring 160. Also, the spring 196, which defines the lower range of normal operation, may be calibrated by clockwise or counter-clockwise rotation of the adjustment screw 200 which, accordingly, raises or lowers the spring retainer 197.

It should be noted that the pilot assembly is easily adaptable to either hydraulic or pneumatic pressure in each of the spool valve and pilot assemblies.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A control fluid valve assembly respondable to a pressure monitored fluid, comprising: a housing; first and second valve seat means within said housing; spool means shuttleable within said housing and immediate said valve seat means by one of manual and mechanical manipulation to each of first and second positions and shuttleably responsive to pressure variation of said monitored fluid to a second position; free traveling spherical means defining first and second valve head groups within said housing and carried by said spool means; and a plurality of seal means securable between said housing and said spool means to prevent fluid communication therebetween and defining flow passageways within said housing and across said spool means, said valve head groups being selectively sealingly engageable onto and wipable off of said seat means to control fluid flow through said assembly in response to said cally stabilized within said means, by one of said seal means and whereby in the other of said first and second positions differential pressure is defined across one of said seal means to urge and hold said spool means in said other position, and said spool means is thereafter shiftable to the said one of first and second positions only by one of manual and mechanical manipulation of said spool means.

10. The control fluid valve assembly of claim 9 further comprising: detent means for engaging said spool means in one of said first and second positions, said detent means being manipulatable in response to predetermined pressure variation of said monitored fluid to disengage said spool means.

11. The control fluid valve assembly of claim 9 further comprising: control shaft means selectively communicable to said spool means for shuttling said spool means to one of said first and second positions; and piston means responsive to predetermined pressure variation of said monitored fluid for shifting of said shaft means to shuttle said spool means.

12. A control fluid valve assembly respondable to a pressure monitored fluid, comprising: a housing; first and second valve seat means within said housing; spool means shuttleable within said housing and immediate said valve seat means by one of manual and mechanical manipulation to each of first and second positions and shuttleably responsive to pressure variation of said monitored fluid to a second position; free traveling spherical means defining first and second valve head groups within said housing and carried by said spool means, a plurality of seal means securable between said housing and said spool means to prevent fluid communication therebetween and defining flow passageways within said housing and across said spool means; and detent means for engaging said spool means in one of said first and second positions, said detent means being manipulatable in response to predetermined pressure variation of said monitored fluid to disengage said spool means, said valve head groups being selectively sealingly engagable onto and wipable off of said valve seat means to control fluid flow through said assembly in response to said pressure monitored fluid, said spool means when in one position placing at least one of said spherical means within one of said first and second valve head groups in sealable alignment with and for subsequent sealing engagement on one of said first and said second valve seat means, said spool means when in said one position preventing sealing alignment of said spherical means within the other of said first and second valve head groups with the other of said first and second valve seat means, said spool means when in the other position wiping the one of said spherical means within the one of said first and second valve head groups off of sealing engagement on the one of said first and second valve seat means and preventing subsequent sealable alignment of the said spherical means with the said valve seat means, said spool means when in said other position placing at least one of said spherical means within the other of said first and second valve head groups in sealable alignment with and for subsequent sealing engagement on the other of said first and second valve seat means, the said valve head means being selectively sealingly engaged onto the said valve seat means by control fluid flow through said assembly, said spool means being shiftable to each of said first and second positions whereby in one of said first and second positions pressure is substantially equalized through said flow passageways by said seal means and said spool means is statically stabilized within said housing by one of said seal means, and whereby in the other of said first and second positions differential pressure is defined across one of said seal means to urge and hold said spool means in said other position, said spool means being thereafter shiftable to the said one of first and second positions only by one of manual and mechanical manipulation of said spool means, said spool means remaining in said one of said first and second positions after disengagement from said detent means.

13. A control fluid valve assembly for controlling flow of a first fluid source and respondable to a pressure monitored fluid, comprising: a housing; valve means within said housing having valve seat means thereon; free travelable spherical means immediate said valve means defining valve head means and sealingly engagable onto said valve seat means and wipable thereoff to selectively open and close said valve means to control fluid flow therethrough; spool means shuttleable in at least one of linear and rotary directions within said housing immediate said valve means and operably associatable with said valve seat means and said valve head means to permit selective movement of said head means to said seat means and selective engagement of said head and seat means upon only one of linear and rotational shuttling of said spool means; and a plurality of seal means, securable between said housing and said spool means to prevent fluid communication therebetween and defining flow passageways within said housing and across said spool means, said spool means being shiftable in each of first and second directions whereby subsequent to shifting in one of said first and second directions pressure is substantially equalized through said flow passageways by said seal means and said spool means is statically stabilized by one of said seal means, within said housing and whereby when said spool means is shifted in the other of said first and second directions differential pressure is thereafter defined across one of said seal means to urge and hold said spool means in said other direction.

14. The control fluid valve assembly of claim 13, and said spool means is thereafter shiftable in the said one of first and second directions only by one of manual and mechanical manipulation of said spool means.

15. The control fluid valve assembly of claim 13 further comprising: detent means for engaging said spool means in one of said first and second positions, said detent means being manipulatable in response to predetermined pressure variation of said monitored fluid to disengage said spool means.

16. The control fluid valve assembly of claim 13 further comprising: detent means for engaging said spool means in one of said first and second positions, said detent means being manipulatable in response to predetermined pressure variation of said monitored fluid to disengage said spool means, said spool means remaining in said one of first and second positions after disengagement from said detent means.

17. The control fluid valve assembly of claim 13 further comprising: control shaft means selectively communicable to said spool means for shuttling said spool means to one of said first and second positions; and piston means for shifting said shaft means to shuttle said spool means.

18. The control fluid valve assembly of claim 13 further comprising: control shaft means selectively communicable to said spool means for shuttling said spool pressure monitored fluid, said spool means when in one position placing at least one of said spherical means within one of said first and second valve head groups in sealable alignment with and for subsequent sealing engagement on one of said first and said second valve seat means, said spool means when in said one position preventing sealing alignment of said spherical means within the other of said first and second valve head groups with the other of said first and second valve seat means, said spool means when in the other position wiping the one of said spherical means within the one of said first and second valve head groups off of sealing engagement on the one of said first and second seat means and preventing subsequent sealable alignment of the said spherical means with the said valve seat means, said spool means when in said other position placing at least one of said spherical means within the other of said first and second valve head groups in sealable alignment with and for subsequent sealing engagement on the other of the said first and second valve seat means, the said valve head means being selectively sealingly engaged onto the said valve seat means by control fluid flow through said assembly, said spool means being shiftable to each of said first and second positions whereby in one of said first and second positions control fluid pressure is substantially equalized through said flow passageway by said seal means and said spool means is statically stabilized within said housing by one of said seal means, and whereby in the other of said first and second positions differential pressure is defined across one of said seal means to urge and hold said spool means in said other position.

2. The control fluid valve assembly of claim 1 further comprising: detent means for engaging said spool means in one of said first and second positions, said detent means being manipulatable in response to predetermined pressure variation of said monitored fluid to disengage said spool means.

3. The control fluid valve assembly of claim 1 further comprising: detent means for engaging said spool means in one of said first and second positions, said detent means being manipulatable in response to predetermined pressure variation of said monitored fluid to disengage said spool means, said spool means remaining in said one of first and second positions after disengagement from said detent means.

4. The control fluid valve assembly of claim 1 further comprising: control shaft means selectively communicable to said spool means for shuttling said spool means to one of said first and second positions; and piston means responsive to predetermined pressure variation of said monitored fluid for shifting of said shaft means to shuttle said spool means.

5. The control fluid valve assembly of claim 1 further comprising: control shaft means selectively communicable to said spool means for shuttling said spool means to one of said first and second positions; and piston means responsive to at least one of predetermined increase and decrease in pressure of said monitored fluid for shifting of said shaft means to shuttle said spool means.

6. The control fluid valve assembly of claim 1 additionally comprising: control shaft means selectively communicable to said spool means for shifting said spool means to one of said first and second positions; and piston means responsive to each of increase and decrease in predetermined pressure of said monitored fluid for shifting of said shaft means to shuttle said spool means.

7. The control fluid valve assembly of claim 1 additionally comprising: control shaft means selectively communicable to said spool means for shuttling said spool means to one of said first and second positions; piston means responsive to at least one of predetermined increase and decrease in pressure of said monitored fluid for shifting of said shaft means to shuttle said spool means; and means within said housing for selectively resisting response of said piston means to pressure variation of said monitored fluid.

8. The control fluid valve assembly of claim 1 further comprising: control shaft means selectively communicable to said spool means for shuttling said spool means to one of said first and second positions; piston means responsive to at least one of predetermined increase and decrease in pressure of said monitored fluid for shifting of said shaft means to shuttle said spool means; and means selectively calibratable to define at least one of high and low pressure variation of said monitored fluid whereby movement of said piston means is resisted until said defined pressure variation of said monitored fluid is encountered.

9. A control fluid valve assembly respondable to a pressure monitored fluid, comprising: a housing; first and second valve seat means within said housing, spool means shuttleable within said housing and immediate said valve seat means by one of manual and mechanical manipulation to each of first and second positions and shuttleably responsive to pressure variation of said monitored fluid to a second position; free traveling spherical means defining first and second valve head groups within said housing and carried by said spool means; and a plurality of seal means securable between said housing and said spool means to prevent fluid communication therebetween and defining flow passageways within said housing and across said spool means, said valve head groups being selectively sealingly engagable onto and wipable off of said valve seat means to control fluid flow through said assembly in response to said pressure monitored fluid, said spool means when in one position placing at least one of said spherical means within one of said first and second valve head groups in sealable alignment with and for subsequent sealing engagement on one of said first and said second valve seat means, said spool means when in said one position preventing sealing alignment of said spherical means within the other of said first and second valve head groups with the other of said first and second valve seat means; said spool means when in the other position wiping the one of said spherical means within the one of said first and second valve head groups off of sealing engagement on the one of said first and second valve seat means and preventing subsequent sealable alignment of the said spherical means with the said valve seat means, said spool means when in said other position placing at least one of said spherical means within the other of said first and second valve head groups in sealable alignment with and for subsequent sealing engagement on the other of the said first and second valve seat means, the said valve head means being selectively sealingly engaged onto the said valve seat means by fluid flow through said assembly, said spool means being shiftable to each of said first and second positions whereby in one of said first and second positions control fluid pressure is substantially equalized through said flow passageways by said seal means and said spool means is statimeans to one of said first and second positions; and piston means responsive to at least one of predetermined increase and decrease in pressure of said monitored fluid for shifting of said shaft means to shuttle said spool means.

19. The control fluid valve assembly of claim 13 further comprising: control shaft means selectively communicable to said spool means for shifting said spool means to one of said first and second directions; and piston means responsive to each of increase and decrease over predetermined pressure of said monitored fluid for shifting of said shaft means to shuttle said spool means.

20. The control fluid valve assembly of claim 13 further comprising: control shaft means selectively communicable to said spool means for shuttling said spool means in one of said first and second directions; piston means responsive to at least one of predetermined increase and decrease in pressure of said monitored fluid for shifting of said shaft means to shuttle said spool means; and means within said housing for selectively resisting response of said piston means to pressure variation of said monitored fluid.

21. The control fluid valve assembly of claim 13 further comprising: control shaft means selectively communicable to said spool means for shuttling said spool means to one of said first and second positions; piston means responsive to at least one of predetermined increase and decrease in pressure of said monitored fluid for shifting of said shaft means to shuttle said spool means; means within said housing for selectively resisting response of said piston means to pressure variation of said monitored fluid; and means selectively calibratable to define at least one of high and low pressure variation of said monitored fluid whereby movement of said piston means is resisted until said defined pressure variation of said monitored fluid is encountered.

* * * * *